United States Patent Office 3,573,308
Patented Mar. 30, 1971

3,573,308
3-LOWER ALKOXY METHYL-3,4-DIHYDRO-4-HYDROXY-4-ARYL QUINAZOLIN-2(1H) ONES AND RELATED COMPOUNDS
Robert Ye-Fong Ning, Verona, and Leo Henryk Sternbach, Upper Montclair, N.J., assignors to Hoffmann-La Roche Inc., Nutley, N.J.
No Drawing. Filed Apr. 3, 1969, Ser. No. 813,304
Int. Cl. C07d 51/48
U.S. Cl. 260—251                                       15 Claims

ABSTRACT OF THE DISCLOSURE 3-lower alkoxy methyl - 3,4 - dihydro - 4 - hydroxy-4-aryl quinazolin-2(1H)ones and derivatives are prepared by reacting 5,9B-dihydro-9B-phenyloxazirino-[2,3d][1,4]-benzodiazepin-4(3H)ones with alcohols or via the reaction of an aryl-phenyl ketone with methyl isocyanates. The quinazolin - 2 - ones are trichomonacides. The invention relates to such quinazolin - 2 - ones, derivatives thereof and processes for making same.

RELATED CASES

The starting oxazirino[2,3d][1,4]benzodiazepin-4(3H)-ones and their method of preparation are disclosed in application Ser. No. 766,649, filed Oct. 10, 1968 in the names of George Francis Field, Robert Ye-Fong Ning and Leo Henryk Sternbach.

DETAILED DESCRIPTION OF THE INVENTION

The present invention relates to pharmacologically useful compounds of the formula

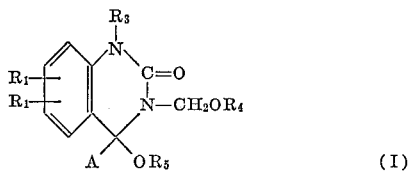

(I)

wherein A is selected from the group consisting of pyridyl and

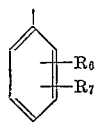

$R_1$ and $R_2$ independently are each selected from the group consisting of hydrogen, halogen, trifluoromethyl, amino, lower alkyl amino, phenyl, nitro, lower alkyl, lower alkyl thio, lower alkyl sulfinyl, lower alkyl sulfonyl, thiocyano and lower alkoxy, with the proviso that when one of $R_1$ or $R_2$ is phenyl, the other is hydrogen; $R_3$ is selected from the group consisting of hydrogen, lower alkenyl, lower alkyl and cycloalkyl; $R_4$ is selected from the group consisting of lower alkyl and hydroxy-lower alkyl, $R_5$ is selected from the group consisting of hydrogen and lower alkyl and $R_6$ and $R_7$ are each selected from the group consisting of hydrogen, halogen, trifluoromethyl, lower alkoxy and lower alkyl.

The term "lower alkyl" or equivalent language as used herein, alone or in combination with another radical, e.g. hydroxy lower alkyl, lower alkyl amino, lower alkoxy and the like, comprehends both straight or branched chain hydrocarbon groups having from 1–7 carbon atoms, preferably 1–4 carbon atoms in the chain such as methyl, ethyl, isopropyl, butyl, pentyl or the like. The term "lower alkenyl" connotes both straight and branched hydrocarbon groups containing one double bond such as allyl and the like. The term "cycloalkyl" represents a cyclic hydrocarbon moiety having from 3 to 6 carbon atoms in the ring such as cyclopropyl, cyclobutyl, cyclopentyl, cyclohexyl and the like. Halogen represents all four forms thereof, i.e. fluorine, iodine, chlorine and bromine, unless otherwise specified.

In a preferred embodiment, $R_1$ in Formula I above is drogen, halogen, trifluoromethyl and nitro; $R_{61}$ is hydrogen or halogen, $R_{31}$ is hydrogen or lower alkyl, preferably, hydrogen and $R_{41}$ is lower alkyl, preferably containing up to 4 carbon atoms.

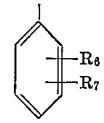

most preferentially when $R_7$ is hydrogen. When $R_6$ is other than hydrogen, halogen is preferred, particularly when positioned in the 2-position of the phenyl nucleus. $R_3$ in Formula I above is preferably selected from the group consisting of hydrogen and lower alkyl, preferably hydrogen; $R_4$ is preferably lower alkyl, most preferably having 1–4 carbon atoms. $R_5$ is preferably hydrogen.

Thus, a preferred class of compounds encompassed by the broader genus of the Formula I above, is of the formula

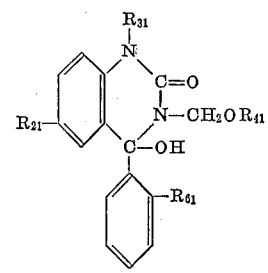

(II)

wherein $R_{21}$ is selected from the group consisting of hydrogen, halogen, trifluoromethyl and nitro; $R_{61}$ is hydrogen or halogen, $R_{31}$ is hydrogen or lower alkyl, preferably, hydrogen and $R_{41}$ is lower alkyl, preferably containing up to 4 carbon atoms.

Compounds of the Formula I above wherein $R_3$ is hydrogen and A is

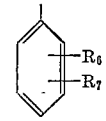

can be prepared in one process aspect by treating a compound of the formula

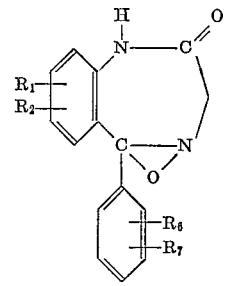

(III)

wherein $R_1$, $R_2$, $R_6$ and $R_7$ are as above with an alcohol of the formula $$HO—R_4 \qquad (IV)$$

wherein $R_4$ is as above.

The reaction can be conducted by simply adding a compound of the Formula III to a compound of the Formula IV or by adding the compound of the Formula III to an inert organic solvent such as tetrahydrofuran, dimethylformamide, hexamethylphosphoramide, dimethylsulfoxide, dioxane and the like and then permitting the resulting medium to stand at a temperature of from about 0° to about 80°, preferably about room temperature, over a period of time depending upon the starting materials utilized. It has been observed that by permitting the reaction mixture to stand, preferentially, at room temperature for a period of from about ½ day to about 15 days, there results the desired compound of the Formula I above. However, it is preferred to effect the reaction in the presence of a basic catalyst such as an alkali metal hydroxide, e.g. sodium hydroxide or an amine such as benzyltrimethylammonium hydroxide and the like. Compounds of the Formula IV above wherein $R_4$ is a lower alkyl group encompass such simple alcohols as methanol, ethanol, pentanol-1, isobutanol, tertiary butanol, butanol, isopropanol, propanol and the like. Representative of compounds of the Formula IV wherein $R_4$ is a hydroxy lower alkyl group are ethylene glycol, propylene glycol, 1,3-dihydroxypropane, 1,4-dihydroxybutane, 1,5-dihydroxypentane and the like.

When a compound of the formula $R_4OH$ wherein $R_4$ is lower alkyl is utilized in the ring contraction of a compound of the Formula III above to the corresponding compound of the Formula I above, it is convenient to utilize an excess of such compound so that it can serve the dual function of being both a reaction participant as well as the solvent medium in which the reaction is effected. Thus, in a preferred embodiment, the reaction is effected in the presence of excessive amounts of a compound of the Formula IV wherein $R_4$ is lower alkyl.

When a compound of the Formula III above is reacted with a compound of the Formula IV above wherein $R_4$ is hydroxy alkyl, it is preferred to effect this process variation in the presence of an inert organic solvent. As suitable solvents for this purpose, there may be included tetrahydrofuran, dimethylsulfoxide, dioxane, dimethylformamide, hexamethylphosphoramide and the like. The preferred solvent for this process modification is tetrahydrofuran.

Compounds of the Formula I above wherein $R_5$ is hydrogen can be converted to the corresponding compounds of the Formula I wherein $R_5$ is lower alkyl. The conversion of a compound of the Formula I above wherein $R_5$ is hydrogen to the corresponding compound of the Formula I above wherein $R_5$ is lower alkyl is effected with an alkanol of the formula $R_5OH$ wherein $R_5$ is lower alkyl, in the presence of an acidic or a basic catalyst. The reaction can be conducted at room temperature but temperature is not critical to a successful performance of this conversion step. Thus, the reaction temperature can vary within wide limits. However, it has been observed that heating can increase the yield although it is not essential.

In a preferred embodiment, the alkanol of the formula $R_5OH$ serves as the reaction medium. Accordingly, as above, the alkanol utilized conveniently can serve a dual purpose, i.e. as a reaction participant, as well as the medium in which the reaction is effected. This end is easily accomplished by the simple expedient of adding a compound of the formula $R_5OH$ wherein $R_5$ is lower alkyl to the reaction zone in excessive amounts.

Any suitable acid or base can be utilized as the catalyst for promoting the conversion of a compound of the Formula I above wherein $R_5$ is hydrogen to the corresponding compound of the Formula I above wherein $R_5$ is lower alkyl. All that is required of the catalyst is that it function efficaciously for the purposes of the present invention. Illustrative of suitable catalysts are basic catalysts such as alkali metal hydroxides such as sodium hydroxide, potassium hydroxide and the like; quaternary ammonium hydroxides or lower alkoxides, e.g. benzyltrimethylammonium hydroxide, benzyltrimethylammonium methoxide and the like; alkali metal alkylates such as sodium methoxide, sodium ethoxide and the like. Acidic catalysts may be represented by the hydrohalides such as hydrogen chloride, hydrogen bromide and the like; alkyl or arylsulfonic acids such as p-toluene sulfonic acid and the like; mineral acids such as sulfuric acid and nitric acid, perhaloorganic acids such as trifluoroacetic acid and the like.

While in a preferred aspect, the compound of the formula $R_5OH$ is utilized as the solution medium, it is of course to be understood that this process variation can be effected in the presence of an inert organic solvent but this approach is less preferred. Among the suitable inert organic solvents for this purpose may be included tetrahydrofuran, dioxane, dimethylformamide, dimethylsulfoxide, hexamethylphosphoramide, pyridine and the like.

In an alternate embodiment, a mixture containing a compound of the Formula I above wherein A is

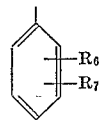

and $R_3$ and $R_5$ are both hydrogen and a corresponding compound of the Formula I above wherein A is

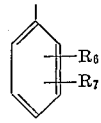

$R_3$ is hydrogen and $R_5$ is lower alkyl can be obtained when treating a compound of the Formula III above with a compound of the Formula IV wherein $R_4$ is lower alkyl in the presence of a basic catalyst such as alkali metal hydroxides, e.g. sodium hydroxide, potassium hydroxide and the like; alkali metal alkylates such as sodium methoxide, hexamethylphosphoramide, pyridine and the like. monium bases such as benzyl trimethylammonium hydroxide, benzyl trimethylammonium lower alkoxides, e.g. benzyl trimethylammonium methoxide and the like.

When proceeding accordingly, it has been observed that a mixture of the last-mentioned compounds of the Formula I results. The reaction medium can be worked-up in a conventional manner to effect the recovery of the individual components, i.e. a compound of the formula

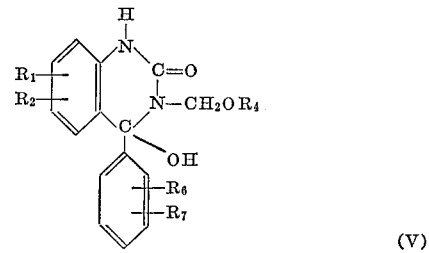

(V)

wherein $R_1$, $R_2$, $R_6$ and $R_7$ are as above and $R_4$ is lower alkyl, and a compound of the formula

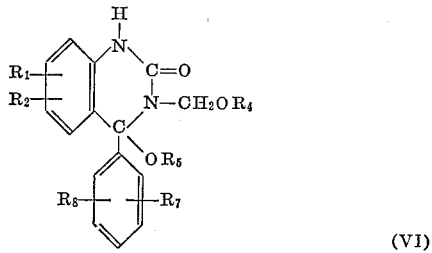

(VI)

wherein $R_1$, $R_2$, $R_6$ and $R_7$ are as above, $R_4$ is lower alkyl and $R_5$ is the same lower alkyl radical as $R_4$.

In this aspect, the preparation of a compound of the Formula V is favored. If it is desired to increase the yield of a compound of the Formula VI, this can be effected by the simple expedient of heating the reaction medium with or without isolating either component present in the mixture.

When performing this process aspect, the same reaction conditions which are described more fully above in connection with the preparation of a compound of the Formula I above wherein $R_5$ is lower alkyl from the corresponding compound of the Formula I above wherein $R_5$ is hydrogen are efficaciously utilized.

In an alternate process aspect, compounds of the Formula I above wherein $R_5$ is hydrogen can be prepared via the reaction of a methyl isocyanate of the formula $$O=C=NCH_2Y$$

wherein Y is selected from the group consisting of lower alkoxy with an aryl phenyl ketone of the formula

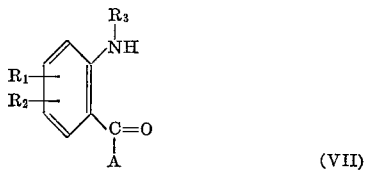

wherein $R_1$, $R_2$, $R_3$ and A are as above.

In a preferred aspect, the reaction is effected at a temperature of from about 20° to about 75°, preferably at about room temperature. Suitably, this reaction aspect is effected in the presence of an inert organic solvent such as pyridene, benzene, tertiary amines such as triethylamine, chloromethane, tetrahydrofuran, dimethylformamide, dimethylsulfoxide and the like. Pyridine is preferred.

If a naphthyl phenyl ketone is utilized as a starting material in this process aspect, that is to say if a compound of the Formula VII above wherein $R_1$ and $R_2$ form together a

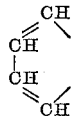 (VIII)

(An aroyl phenyl ketone which has the formula

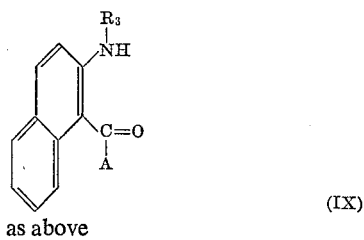

wherein A and $R_3$ are as above which may be substituted on the naphthyl moiety), there results a compound of the formula

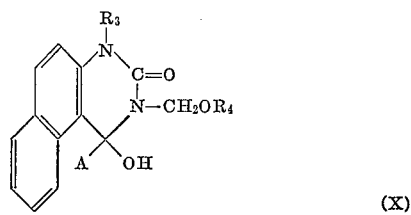

wherein A, $R_3$ and $R_4$ are as above.

The compound of the Formula X, if desired, may be substituted on the naphthyl moiety with halogen (chlorine or bromine), lower alkoxy (methoxy), lower alkyl (methyl) and the like.

In a like manner to that described above in connection with the conversion of a compound of the Formula I wherein $R_5$ is hydrogen to the corresponding compound wherein $R_5$ is lower alkyl, compounds of the Formula X can also be converted to the corresponding compound which contains a lower alkoxy group in position-4.

Compounds of the Formulas I, II and X above wherein $R_3$ and $R_{31}$ are hydrogen can be converted into the corresponding compound wherein $R_3$ or $R_{31}$ is lower alkyl by first forming the sodio derivative of the former with an alkali metal alkoxide, e.g. sodium methoxide, potassium t-butoxide and the like or an alkali metal hydride such as sodium hydride and the like and treating the said sodio derivative with alkylating agents such as a lower alkyl halide, e.g. methyl iodide or ethyl iodide, dilower alkyl sulfates such as dimethyl sulfate and the like. Compounds of the Formulas I, II and X wherein $R_3$ or $R_{31}$ is a cyclopropyl group or a lower alkenyl group can be similarly prepared, e.g. by treating with a lower alkenyl halide such as allyl bromide after first forming a sodio derivative.

The compounds of the Formulas I, II and X above, have antiprotozoal activity. Particularly, they are trichomonacides and accordingly they are useful in the treatment of trichomonal infections. Examples of trichomonal infections are trichomonal vaginitis, a troublesome vaginal infection caused by parasitic protazoan *Trichomonas vaginalis* and the infection caused by *Trichomonas foetus*. The compounds of the Formulas I, II and X above show considerable "in vivo" and "in vitro" activity which is particularly marked on *Trichomonas vaginalis*.

Compounds of the Formula III are most conveniently prepared by irradiating a compound of the following formula

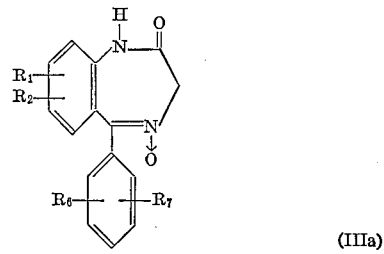

wherein $R_1$, $R_2$, $R_6$ and $R_7$ are as above.

The reaction described above proceeds by irradiation with light energy of a specific range of wavelengths which is obtained from a mercury arc lamp. A most preferred light source for the purpose of irradiation used in the preparation of compounds of the present invention consists of a medium pressure mercury arc lamp which is fitted with a Pyrex filter sleeve to remove light of wavelengths less than about 300 m$\mu$. The resulting light beam will contain wavelengths substantially in the range between about 300 to about 400 m$\mu$ which light will be of sufficient energy to effect the desired irradiation reaction but will be below the energy levels which cause degradation of the compounds of Formula I.

The irradiation reaction is most conveniently conducted in an inert organic solvent conveniently employed in irradiation procedures. Suitable solvents include, for example, ethers such as tetrahydrofuran, esters, ketones, hydrocarbons and halogenated hydrocarbons. Tetrahydrofuran is a solvent of preference.

The subject reaction is conducted under an inert atmosphere such as for example a nitrogen, argon, helium, etc. atmosphere. The reaction temperature employed is not critical to this process and conventional temperatures useful in irradiation procedures can be used, such as for example a temperature in the range of from about −70 to 150° C., most preferably in the range of from about 10 to 30° C.

The preparation of compounds of the Formula III are illustrated by the following examples.

Preparation of 8-chloro-5,9B-dihydro-9B-phenyloxazirino (2,3D)(1,4)benzodiazepin-4(3H)-one (7 - chloro - 4,5-epoxy-5-phenyl-1,3,4,5 - tetrahydro - 2H - 1,4-benzodiazepin-2-one)

A solution of 26.8 g. (0.0935 mole) of 7-chloro-1,3-dihydro-5-phenyl-2H-1,4-benzodiazepin-2-one 4 - oxide in 1.4 liters of tetrahydrofuran was irradiated with a Hanovia 250 w. medium pressure mercury arc (No. 654 A) through a Pyrex filter, under nitrogen atmosphere at 20° for 22 hours. The solution was concentrated in vacuo to a small volume. Addition of hexane and chilling gave the above-titled product as colorless prisms, melting with sudden decomposition in the temperature range of 136–150°. An analytical sample was prepared by recrystallization from tetrahydrofuran methanol mixtures, M.P. 136° d.

Preparation of 8 - chloro-5,9B-dihydro-9B-(2-fluorophenyl)-oxazirino(2,3D)(1,4-benzodiazepin - 4(3H) - one (7-chloro-4,5-epoxy - 5 - (2-fluorophenyl)-1,3,4,5-tetrahydro-2H-1,4-benzodiazepin-2-one)

A solution of 20.0 g. of 7-chloro-1,3-dihydro-5-(2-fluorophenyl)-2H-1,4-benzodiazepin - 2 - one 4 - oxide in 1.4 liters of tetrahydrofuran was irradiated under the same conditions as described in the previous example. The irradiated solution was evaporated to near dryness. Addition of benzene to the concentrated solution caused crystallization of the above-titled compound, M.P. 139° dec.

Said compounds of the Formulas I, II and X above and derivatives thereof can be administered with dosage adjusted to individual requirements and fitted to the pharmaceutical exigencies of the situation. For example, they can be administered internally, i.e. enterally or parenterally in the form of tablets, suspensions, solutions, capsules, dragees and the like according to conventional pharmaceutical procedures. Additionally they can be converted into ointments, jellies, creams, powders and suppositories to treat the troublesome infestation caused by the parasitic protozoal *T. vaginalis* and *T. foetus*.

Thus, the invention relates to novel 3-alkyloxymethyl-4-hydroxy quinazolinones and to novel 3-alkyloxymethyl-4-lower alkoxy quinazolinones and to processes for preparing same.

The following examples are illustrative but not limitative of the present invention. All temperatures are stated in degrees centigrade.

The following examples are illustrative but not limitative of the present invention. All temperatures are stated in degrees centigrade.

Example 1.—A suspension of 17.5 g. (61 mmoles) of 8-chloro-5,9B-dihydro - 9B - phenyloxazirino(2,3D)(1,4) benzodiazepin-4(3H)-one in 2600 ml. of methanol was stirred at room temperature for 8 days during which period a clear solution formed and no 8-chloro-5,9B-dihydro - 9B - phenyloxazirino(2,3D)(1,4)benzodiazepin-4(3H)-one remained as indicated by TLC and the starch-iodide test (J. Org. Chem., 27 4671 (1962) and references cited therein). Methanol was removed by evaporation. The residual solid was recrystallized from acetonitrile, giving 6-chloro-3,4-dihydro-4-hydroxy-3-methoxy-methyl-4-phenyl-2(1H)-quinazolinone, M.P. 179–182°.

Example 2.—A solution of 178 mg. (0.77 mmole) of 2-amino-5-chloro-benzophenone and 65 mg. (0.70 mmole) of methoxymethyl isocyanate in 5 ml. pyridine was allowed to stand at room temperature for 24 hrs. The reaction mixture was thereafter heated for ½ hour on the steam bath and then poured on ice. A yellow, partially solidified oil separated on standing. The clear aqueous layer was separated from the oil, diluted with more water until turbidity developed, then seeded with 6-chloro-3,4-dihydro-4-hydroxy-3-methoxymethyl - 4 - phenyl-2(1H)-quinazolinone. On standing at 0°, 6-chloro-3,4-dihydro-4-hydroxy - 3 - methoxymethyl - 4 - phenyl - 2(1H)-quinazolinone crystallized. After washing with ether, the product was found to have a melting point of 181–183°. The melting point was undepressed after mixing with the product of Example 1.

Methoxymethyl isocyanate used above was obtained as follows:

To a stirring suspension of 200 g. (1.30 mole) of silver isocyanate in 1.0 liter of anhydrous xylene at room temperature, was added 81.0 g. (1.00 mole) of freshly prepared (Organic Synthesis, Coll. vol. I, 377) and redistilled chloromethyl methyl ether. The temperature rose from 23° to 49°. The reaction mixture was cooled to room temperature and stirred in the dark, in an aluminum foil covered flask, for 24 hrs. The solids were removed by filtration, followed by washing with xylene. The combined filtrate and washings were distilled and redistilled at atmospheric pressure through a Vigreux column. Methoxymethyl isocyanate, the fraction boiling between 89–94°, was collected.

Example 3.—A suspension of 25.0 g. (87 mmoles) of 8-chloro-5,9B-dihydro - 9B - phenyloxazirino(2,3D) (1,4)benzodiazepin-4(3H)-one in 3800 ml. of ethanol was stirred at room temperature for 8 days. In this period a clear solution formed and no starting material was detectable. Ethanol was evaporated. Recrystallization of the residual solid from acetonitrile gave 6-chloro-3,4-dihydro - 3 - ethoxymethyl - 4 - hydroxy-4-phenyl-2(1H)-quinazolinone as colorless needles, M.P. 168–169°.

Example 4.—A solution of 44.8 g. (160 mmoles) of 8-chloro-5,9B-dihydro - 9B - phenyloxazirino(2,3D)(1,4) benzodiazepin-4(3H)-one in 250 ml. of ethylene glycol and 500 ml. of tetrahydrofuran was allowed to stand at room temperature for 14 days. The tetrahydrofuran was removed by evaporation. The glycolic solution was poured into 3 liters of cold water. A gummy solid formed, in two crops and was collected in sintered glass funnel, dried, then boiled in 500 ml. acetonitrile, and filtered hot. The acetonitrile filtrate was concentrated. 6-chloro-3,4-dihydro - 4 - hydroxy-3(2-hydroxy-ethoxymethyl)-4-phenyl - 2(1H)quinazolinone crystallized as colorless prisms. After recrystallizations from acetonitrile, it was found to have a melting point of 160–161°.

Example 5.—A suspension of 5.00 g. (17.4 mmoles) of 8-chloro-5,9B-dihydro-9B-phenyloxazirino(2,3D)(1,4) benzodiazepin-4(3H)-one in 1.0 liter of isopropanol was stirred at room temperature for 13 days. The resulting clear solution was evaporated to dryness. The residue, on analysis with TLC contained predominantly 6-chloro-3,4-dihydro-4-hydroxy-3-isopropoxymethyl-4-phenyl - 2(1H)-quinazolinone ($R_f$ 0.43). The residue was dissolved in ethanol and filtered. The filtrate was evaporated to remove ethanol. The residue was crystallized from benzene-n-heptane yielding 6-chloro-3,4-dihydro-4-hydroxy-3-isopropoxy-methyl - 4 - phenyl-2(1H)quinazolinone as colorless rods, M.P. 189–190° d. After three recrystallizations from benzene-n-heptane, the yield had a melting point of 191–192° d.

Example 6.—A suspension of 5.00 g. (17.4 mmoles) of 8-chloro-5,9B-dihydro-9B-phenyloxazirino(2,3D)(1,4) benzodiazepin-4(3H)-one in 1.0 l. of n-butanol was stirred at room temperature for 13 days. The resulting clear solution was evaporated to dryness. Recrystallization of the residual yellow solid from acetonitrile gave 3-n-butoxymethyl - 6 - chloro-3,4-dihydro-4-hydroxy-4-phenyl-2(1H)-quinazoline as faintly yellow short needles, M.P. 169–171° d.

Example 7.—A suspension of 5.00 g. (17.4 mmoles) of 8-chloro-5,9B-dihydro-9B-phenyloxazirino(2,3D)(1,4) benzodiazepin-4(3H)-one in 1.0 l. of 1-pentanol was allowed to stir at room temperature for 3 weeks. The resulting clear solution was evaporated to dryness at 70–75°. The residual gum was dissolved in 20 ml. of hot benzene, to which solution 80 ml. of n-heptane was added. Upon standing at 5°, impure 6-chloro-3,4-dihydro-4-hydroxy-3-pentoxymethyl - 4 - phenyl-2(1H)-quinazolinone crystallized. Recrystallization from benzene-heptane (1:2) gave the material with M.P. of 156–159°. After three more recrystallizations from benzene-heptane, pure 6-chloro-3,4-dihydro - 4 - hydroxy - 3 - pentoxymethyl-4- phenyl-2(1H)-quinazolinone was obtained as light yellow needles, M.P. 163–164.5°.

Example 8.—A suspension of 1.75 g. (6.1 mmoles) of 8-chloro-5,9B-dihydro - 9B - phenyloxazirino[2,3D][1,4] benzodiazepin-4(3H)-one in 750 ml. of methanol was stirred at room temperature. A clear solution formed overnight. The course of the reaction was monitored by TLC analysis (silica gel, ether) at intervals. After standing for 48 hours, there was isolated from the resultant medium 6-chloro-3,4-dihydro-4-hydroxy-3-methoxymethyl-4-phenyl-2(1H)-quinazolinone.

Example 9.—A suspension of 1.75 g. (6.1 mmoles) of 8-chloro-5,9B-dihydro - 9B - phenyloxazirino[2,3D][1,4] benzodiazepin-4(3H)-one in 750 ml. methanol containing 1.0 ml. of a 35 percent methanolic solution of benzyltrimethylammonium hydroxide was stirred at room temperature. A clear solution formed in 10 min. After 1 hr., the methanolic solution was concentrated in vacuo. Crystalline 6-chloro-3,4-dihydro-4-hydroxy-3-methoxymethyl-4-phenyl-2(1H)-quinazolinone which precipitated was collected and washed thoroughly with methanol. A second crop of 6-chloro-3,4-dihydro-4-hydroxy-3-methoxymethyl-4-phenyl-2(1H)-quinazolinone was obtained by concentration of the methanolic mother liquor and washings followed by dilution with water. The two crops were combined and recrystallized from acetonitrile yielding the product as colorless platelets, M.P. 180–182°. Mixture M.P. with authentic 6-chloro-3,4-dihydro-4-hydroxy-3-methoxymethyl-4-phenyl-2(1H)-quinazolinone was undepressed.

Example 10.—A suspension of 1.75 g. (6.1 mmoles) of 8-chloro - 5,9B - dihydro-9B-phenyloxazirino[2,3D][1,4]benzodiazepin-4(3H)-one in 500 ml. of methanol containing 1.0 ml. of triethylamine was stirred at room temperature for 20 min. The resulting clear solution was evaporated in vacuo to dryness. The residual solid was recrystallized from acetonitrile to give 6-chloro-3,4-dihydro-4-hydroxy-3-methoxymethyl - 4-phenyl-2(1H)-quinazolinone as colorless platelets, M.P. 183–184°.

Example 11.—A suspension of 200 mg. (0.70 mmole) of 8-chloro - 5,9B - dihydro-9B-phenyloxazirino[2,3D][1,4]benzodiazepin-4(3H)-one in 75 ml. of methanol containing 1.0 ml. of a 35 percent methanolic solution of benzyltriethylammonium hydroxide was stirred at room temperature. After 18 hrs. 6-chloro-3,4-dihydro-4-hydroxy-3-methoxymethyl - 4 - phenyl-2(1H)-quinazolinone was obtained as the major component and 6-chloro-3,4-dihydro-4-methoxy - 3 - methoxymethyl-4-phenyl-2(1H)-quinazolinone was obtained as a minor component. The resultant reaction mixture was heated to a gentle reflux on the steambath for 25 min. The methanolic mixture was concentrated in vacuo to about 20 ml. then filtered through a column of 30 g. of silica gel, followed by elution of the column with 200 ml. of ethyl acetate. The combined effluent from the column was evaporated in vacuo to dryness. The residual yellow oil crystallized from 5 ml. of acetonitrile to give 6-chloro-3,4-dihydro-4-methoxy-3-methoxymethyl - 4 - phenyl-2(1H)-quinazolinone (87 percent) as colorless prisms, M.P. 183–185°.

Example 12.—A solution of 8.10 g. (32.5 mmoles) of 2-amino-5-chloro-2′-fluorobenzophenone and 2.60 g. (29.9 mmoles) of methoxymethyl isocyanate in 30 ml. of pyridine was stirred at room temperature for one day. The mixture was poured into ice water. The precipitated oil solidified on standing. After collection on filter, washing with water and drying, the solid was recrystallized from acetonitrile to give 6-chloro-3,4-dihydro-4-(2-fluorophenyl)-4-hydroxy - 3 - methoxymethyl-2(1H)-quinazolinone as colorless flakes, M.P. 197–198°.

Example 13.—A solution of 7.00 g. (20 mmoles) of 6-chloro-3,4 - dihydro - 3 - ethoxymethyl-4-hydroxy-4-phenyl-2(1H)-quinazolinone and 58 mg. of p-toluenesulfonic acid monohydrate in 350 ml. of methanol was stirred at room temperature for 2 hrs. The reaction mixture was passed through a bed of Florisil which was then washed with some methanol. The filtrate was evaporated to dryness. The residue was dissolved in methylene chloride and filtered through a fresh bed of Florisil, which was then eluted with ether. The combined effluent was evaporated to dryness. The residual oil crystallized from ether and hexane, to give 6-chloro - 3,4 - dihydro-3-ethoxymethyl - 4 - methoxy-4-phenyl-2(1H)-quinazolinone, M.P. 171–173°.

Example 14.—A solution of 1.00 g. (3.0 mmoles) of 6-chloro - 3,4 - dihydro-3-ethoxymethyl - 4 - hydroxy-4-phenyl-2(1H)-quinazolinone in 45 ml. of ethanol containing 1.62 g. (30 mmoles) of sodium methoxide was allowed to stand at room temperature for 20 hrs. The crude product was precipitated by addition of ice-water, collected, washed with water and dried. After two recrystallizations from hexane, 6-chloro - 3,4 - dihydro-4-ethoxy-3-ethoxymethyl-4-phenyl-2(1H)-quinazolinone was obtained, M.P. 159–161°.

Example 15.—A solution of 5.00 g. (16.0 mmoles) of 6-chloro-3,4 - dihydro - 4 - hydroxy-3-methoxymethyl-4-phenyl-2(1H)-quinazolinone and 60 mg. of p-toluenesulfonic acid monohydrate in 350 ml. of methanol was stirred at room temperature for one-half hour. The reaction mixture was filtered through a bed of Florisil, which was then washed with some methanol. The effluent was evaporated to dryness. The residue was redissolved in methylene chloride and filtered through a fresh bed of Florisil, followed by elution with ether. The ethereal effluent was evaporated to dryness. The residual oil crystallized on standing. After recrystallizations from acetonitrile, 6-chloro - 3,4 - dihydro-4-methoxy-3-methoxymethyl-4-phenyl-2(1H)-quinazolinone was obtained, M.P. 184–186.5°.

Example 16.—A solution of 500 mg. (1.6 mmoles) of 6-chloro - 3,4 - dihydro-4-hydroxy-3-methoxymethyl-4-phenyl-2(1H)-quinazolinone and a few crystals of p-toluenesulfonic acid monohydrate in 25 ml. of absolute ethanol was allowed to stand for 15 minutes at room temperature. Acid was removed by passage of the solution through a bed of Florisil. Removal of ethanol by evaporation and crystallization of the residue from acetonitrile gave 6-chloro-3,4 - dihydro - 4 - ethoxy-3-methoxymethyl-4-phenyl-2(1H) - quinazolinone, M.P. 157.5–158°. After recrystallizations of product from acetonitrile, M.P. dropped to 137–140°. However, if the melt was allowed to resolidify in the capillary tube and M.P. redetermined, it was 157–159°.

Example 17.—A mixture of 1.00 g. (3.1 mmoles) of 6-chloro - 3,4 - dihydro-4-hydroxy-3-methoxymethyl-4-phenyl-2(1H)-quinazolinone and 1.24 g. (3.1 mmoles) of sodium hydroxide in 50 ml. of ethanol was stirred at room temperature for 20 hrs. Ethanol was removed by evaporation. The product was isolated by extractions from water with methylene chloride. After crystallization from hexane, crude 6-chloro-3,4-dihydro-4-ethoxy-3-methoxymethyl-4-phenyl-2(1H)-quinazolinone was obtained. After trituration of the crude with hexane, the resultant medium was heated and filtered when hot. The hexane filtrate was evaporated to dryness. Recrystallizations of residue from acetonitrile gave 6-chloro-3,4-dihydro-4-ethoxy-3-methoxymethyl - 4 - phenyl-2(1H)-quinazolinone of M.P. 157.5–158.5° was obtained identical to the same product obtained in Example 16.

Example 18.—A suspension of 504 mg. (2.0 mmoles) of 8-chloro-5,9B-dihydro - 9B - phenyloxazirino(2,3D)(1,4)benzodiazepin-4-(3H)-one in 40 ml. methanol was stirred at room temperature for 5 days. The clear solution formed was evaporated to dryness. Crystallization of residual gum from acetonitrile gave 3,4-dihydro-4-hydroxy-3-methoxymethyl - 4 - phenyl - 2(1H)-quinazolinone, M.P. 173–178° D. The crude product was boiled in 15 ml. of methanol, and filtered hot to remove some undissolved impurities. The methanolic solution was evaporated to dryness. Recrystallization of the residue from 5 ml. acetonitrile gave 3,4-dihydro-4-hydroxy-3-methoxymethyl-4-phenyl-2(1H)-quinazoline as colorless plates, M.P. 173–175° D.

Example 19.—A solution of 9.00 g. (32.5 mmoles) of 2-(2-amino-5-bromobenzoyl)pyridine and 2.60 g. (2.6 ml., 29.9 mmoles) of methoxymethyl isocyanate in 30 ml. pyridine was stirred at room temperature for 24 hrs. The reaction mixture was poured on ice. A yellow solid formed, was collected on filter and washed well with water. After the solid was dried, it was stirred in 150 ml. of ether for one-half hour and recollected by filtration. The washed solid was found to be 6-bromo-3,4-dihydro-4-hydroxy - 3 - methoxymethyl-4-(2-pyridyl)-2(1H)-quinazolinone, M.P. 202–203° d. After recrystallization of the product from acetonitrile, it was obtained as colorless needles, M.P. 204–205° d.

Example 20.—A solution of 4.2 g. (16.2 mmoles) of 2-amino-2'-chloro-4,5-dimethyl-benzophenone and 1.30 g. (15.0 mmoles) of methoxymethyl isocyanate in 30 ml. of dry pyridine was stirred at room temperature overnight. A 40 percent solution in methanol of N-benzyltrimethylammonium hydroxide (0.5 ml.) was added. The mixture was stirred further for 1 hr., then poured on ice. The solid precipitated was recrystallized from acetonitrile to give 4 - (2 - chlorophenyl) - 3,4 - dihydro-6,7-dimethyl-4-hydroxy-3-methoxymethyl-2(1H)-quinazolinone as colorless plates, M.P. 199–201°.

Example 21.—A solution of 7.40 g. (32.5 mmoles) of 2-amino-5-trifluoromethyl-benzophenone and 2.60 g. (29.9 mmoles) of methoxymethyl isocyanate in 40 ml. of dry pyridine was stirred and heated to 50–60° for 5 hrs. A 40 percent solution of N-benzyltrimethylammonium hydroxide in methanol (0.5 ml.) was added. Heating at 50–60° and stirring was continued for 30 min., then poured into ice water. The precipitated solid was recrystallized from acetonitrile to give 3,4-dihydro-4-hydroxy-3-methoxymethyl - 4 - phenyl-6-trifluoromethyl-2(1H)quinazolinone as colorless prisms, M.P. 189–190°.

Example 22.—By the procedure described in Example 21, utilizing 2-amino-5-nitrobenzophenone as a starting material, there was obtained 3,4-dihydro-4-hydroxy-3-methoxymethyl - 6 - nitro-4-phenyl-2(1H)-quinazolinone. Upon crystallization from acetonitrile, the product was obtained as colorless plates, M.P. 195.5–196.5°.

Example 23.—By the procedure described in Example 21, utilizing 2-amino-4'-methylbenzophenone as a starting material, there was obtained 6-bromo-3,4-dihydro-4-hydroxy - 3 - methoxymethyl-4-(4-methylphenyl)-2(1H)-quinazolinone. The product crystallized from acetonitrile as colorless plates, M.P. 195–196°.

Example 24.—By the procedure described in Example 21, utilizing 1-(2-aminonaphthyl)phenyl ketone as a starting material, there was obtained 1,2-dihydro-1-hydroxy-2-methoxymethyl - 1 - phenylbenzo[f]quinazolin - 3(4H)-one. The product crystallized from acetonitrile as colorless needles, M.P. 188.5–189.5°.

Example 25.—By the procedure described in Example 21, utilizing 2-amino-5-phenylbenzophenone as a starting material, there was obtained 3,4-dihydro-4,6-diphenyl-4-hydroxy - 3 - methoxymethyl-2-(1H)-quinazolinone. The product mixture however did not crystallize when the solution in pyridine was poured into ice water. Therefore, the product was isolated by extractions into methylene chloride. Evaporation of the combined methylene chloride solutions and trituration with ether gave 3,4-dihydro-4,6-diphenyl - 4-hydroxy-3-methoxymethyl-2(1H)-quinazolinone as colorless plates, M.P. 194–196°. After recrystallization from acetonitrile, the product was found to have a melting point of 194.5–195.5°.

Example 26.—As in Example 25, utilizing 2-amino-5-fluorobenzophenone as a starting material, compound 3,4-dihydro - 6 - fluoro-4-hydroxy-3-methoxymethyl-4-phenyl-2(1H)-quinazolinone was obtained. The product was crystallized from acetonitrile as colorless prisms, M.P. 180–182°.

Example 27.—By the procedure described in Example 21 utilizing 2-amino-2'-fluoro-5-nitrobenzophenone as a starting material, there was prepared 3,4-dihydro-4-(2-fluorophenyl - 4 - hydroxy - 3 - methoxymethyl-6-nitro-2 (1H)-quinazolinone. The product crystallized from acetonitrile as colorless amorphous solid, M.P. 204–205°.

Example 28.—By the procedure described in Example 25 utilizing 2-amino-2',5-dichlorobenzophenone as a starting material, 6-chloro-4-(2-chlorophenyl)-3,4-dihydro-4-hydroxy-3-methoxymethyl-2(1H)-quinazolinone was obtained. The product crystallized from acetonitrile as yellow plates, M.P. 194–195.5°.

Example 29.—By the procedure described in Example 25 utilizing 2-amino-5-thiocyanobenzophenone, 3,4-dihydro - 4 - hydroxy - 3 - methoxymethyl-4-phenyl-6-thiocyano-2(1H)-quinazolinone was obtained. The product crystallized from methylene chloride-petroleum ether as yellow amorphous solid, M.P. 162–164°.

Example 30.—A suspension of 10.8 g. of 8-chloro-5,9B-dihydro - 9B - (2 - fluorophenyl)oxazirino(2,3D)(1,4) benzodiazepin-4(3H)-one in 1.5 liter of methanol was stirred at room temperature for three weeks. Methanol was evaporated. The residue was recrystallized from acetonitrile. Filtration of hot acetonitrile solutions to remove some insoluble contaminants was necessary. 6-chloro - 3,4 - dihydro - 4(2 - fluorophenyl)-4-hydroxy-3-methoxy-methyl-2(1H)-quinazolinone was obtained as colorless flakes, M.P. 202–3°.

EXAMPLE 31.—5 PERCENT CREAM

| | Mg. per gram |
|---|---|
| 6-chloro-3,4-dihydro-3-ethoxymethyl-4-hydroxy-4-phenyl-2(1H)-quinazolinone | 50.00 |
| Stearyl alcohol | 100.00 |
| Cetyl alcohol | 15.00 |
| White petrolatum | 70.00 |
| Methyl parahydroxylbenzoate, U.S.P. | 2.00 |
| Propyl parahydroxybenzoate, U.S.P. | 0.50 |
| Isopropyl palmitate | 60.00 |
| Polyoxyl 40 stearate, U.S.P. | 40.00 |
| Propylene glycol | 120.00 |
| Disodium versenate | 0.10 |
| Distilled water | 548.16 |

PROCEDURE (1) The stearyl alcohol, cetyl alcohol, petrolatum, propyl parahydroxybenzoate, isopropyl palmitate and polyoxyl 40 stearate were melted at 75° C. The mixture was cooled and maintained at 70° C.

(2) Disodium versenate and methyl parahydroxybenzoate were dissolved in hot distilled water to which was added the propylene glycol. The solution was mixed at 75° C. and slowly added to the oil solution prepared previously, using slow agitation. The emulsion was gradually cooled with slow stirring.

(3) When the temperature of the cream reached 55° C., a solution of 6-chloro-3,4-dihydro-3-ethoxymethyl-4-hydroxy-4-phenyl-2(1H)-quinazolinone was added and mixed with the cream.

(4) When the temperature of the cream reached 50° C., cold water was circulated in the jacket of the kettle and the cream was cooled to 30° C. with stirring. The cream was then transferred to storage containers.

EXAMPLE 32.—CAPSULE FORMULATION

| | Per capsule mg. |
|---|---|
| 6-chloro-3,4-dihydro-3-ethoxymethyl-4-hydroxy-4-phenyl-2(1H)-quinazolinone | 10 |
| Lactose, U.S.P. | 165 |
| Corn starch, U.S.P. | 30 |
| Talc, U.S.P. | 5 |
| Total weight | 210 |

13
PROCEDURE (1) 6-chloro-3,4-dihydro-3-ethoxymethyl-4-hydroxy-4-phenyl-2(1H)-quinazolinone, lactose and corn starch were mixed in a suitable mixer.

(2) The mixture was further blended by passing through a Fitzpatrick Comminuting Machine with a No. 1A screen with knives forward.

(3) The blended powder was returned to the mixer, the talc added and blended thoroughly.

(4) The mixture was filled into No. 4 hard shell gelatin capsules on a Parke-Davis capsulating machine. (Any similar type capsulating machine may be used.)

EXAMPLE 33.—TABLET FORMULATION

Per tablet mg.

6-chloro-3,4-dihydro-3-ethoxymethyl-4-hydroxy-
4-phenyl-2(1H)-quinazolinone _____ 25.00
Dicalcium phosphate dihydrate, unmilled _____ 175.00
Corn starch _____ 24.00
Magnesium stearate _____ 1.00

Total weight _____ 225.00

PROCEDURE (1) 6-chloro-3,4-dihydro-3-ethoxymethyl-4-phenyl-2(1H)-quinazolinone and corn starch were mixed together and passed through a No. 00 screen in Model "J" Fitzmill with hammers forward.

(2) This premix was then mixed with dicalcium phosphate and one-half of the magnesium stearate, passed through a No. 1A screen in Model J Fitzmill with knives forward, and slugged.

(3) The slugs were passed through a No. 2A plate in a Model D Fitzmill at slow speed with knives forward, and the remaining magnesium stearate was added.

(4) The mixture was mixed and compressed.

EXAMPLE 34.—SUPPOSITORY FORMULATION

Per 1.3 gm.
suppository gm.

6-chloro-3,4-dihydro-3-ethoxymethyl-4-hydroxy-
4-phenyl-2(1H)-quinazolinone _____ 0.010
Wecobee M _____ 1.245
Carnauba wax _____ 0.045

PROCEDURE (1) The Wecobee M and the carnauba wax were melted in a suitable size glass-lined container (stainless steel may also be used), mixed well and cooled to 45° C.

(2) The 6-chloro-3,4-dihydro-3-ethoxymethyl-4-hydroxy-4-phenyl-2(1H)-quinazolinone which had been reduced to a fine powder with no lumps, was added and stirred until completely and uniformly dispersed.

(3) The mixture was poured into suppository molds to yield suppositories having an individual weight of 1.3 grams.

(4) The suppositories were cooled and removed from molds. They were then individually wrapped in wax paper for packaging (foil may also be used).

We claim:

1. A compound of the formula

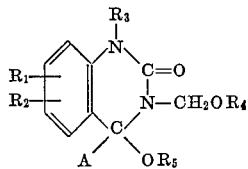

wherein A is selected from the group consisting of pyridyl and

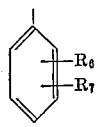

14

$R_1$ and $R_2$ independently are each selected from the group consisting of hydrogen, halogen, trifluoromethyl, nitro, phenyl, lower alkyl, thiocyano and lower alkoxy, with the proviso that when one of $R_1$ and $R_2$ is phenyl, the other is hydrogen; $R_3$ is selected from the group consisting of hydrogen, and lower alkyl; $R_4$ is selected from the group consisting of lower alkyl and hydroxy lower alkyl; $R_5$ is selected from the group consisting of hydrogen and lower alkyl and $R_6$ and $R_7$ are each selected from the group consisting of hydrogen, halogen and lower alkyl.

2. A compound as defined in claim 1 wherein $R_3$ and $R_5$ are both hydrogen and A is the grouping

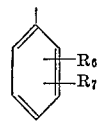

wherein $R_7$ is hydrogen, i.e. a compound of the formula

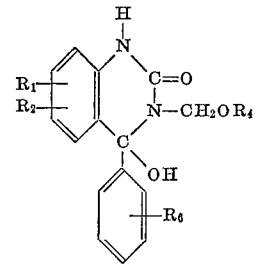

wherein $R_1$ and $R_2$ independently are each selected from the group consisting of hydrogen, halogen, trifluoromethyl, nitro, lower alkyl, phenyl, thiocyano and lower alkoxy, with the proviso that when one of $R_1$ and $R_2$ is phenyl, the other is hydrogen; $R_4$ is selected from the group consisting of lower alkyl and hydroxy lower alkyl and $R_6$ is selected from the group consisting of hydrogen, halogen and lower alkyl.

3. A compound as in claim 2 wherein $R_4$ is lower alkyl.

4. A compound as in claim 3 wherein $R_1$ is hydrogen.

5. A compound as in claim 3 of the formula 6-chloro-3,4-dihydro-3-ethoxymethyl-4-hydroxy-4-phenyl-2(1H)-quinazolinone.

6. A compound as in claim 3 of the formula 6-chloro-3,4-dihydro-3-ethoxymethyl-4-hydroxy-4-phenyl-2(1H)-quinazolinone.

7. A compound as in claim 3 of the formula 6-chloro-3,4-dihydro-4-hydroxy-3-isopropoxymethyl-4-phenyl-2(-H)-quinazolinone.

8. A compound as in claim 3 of the formula 3-n-butoxymethyl-6-chloro-3,4-dihydro-4-hydroxy-4-phenyl-2(1H)-quinazolinone.

9. A compound as in claim 3 of the formula 6-chloro-3,4-dihydro-3-pentoxymethyl-4-phenyl-2(1H)-quinazolinone.

10. A compound as in claim 2 of the formula 6-chloro-3,4-dihydro-4-hydroxy-3-(2-hydroxyethoxy-methyl)-4-phenyl-2(1H)-quinazolinone.

11. A compound of the formula

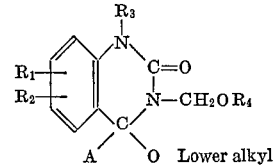

wherein A is selected from the group consisting of

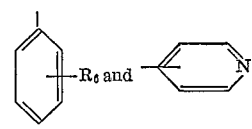

$R_1$ and $R_2$ independently are each selected from the group consisting of hydrogen, halogen, trifluoromethyl, nitro, phenyl, lower alkyl, thiocyano and lower alkoxy, with the proviso that when one of $R_1$ and $R_2$ is phenyl, the other is hydrogen; $R_3$ is selected from the group consisting of hydrogen and lower alkyl; $R_4$ is selected from the group consisting of lower alkyl and hydroxy lower alkyl and $R_6$ is selected from the group consisting of hydrogen, halogen and lower alkyl.

12. A compound as defined in claim 11 of the formula 6-chloro - 3,4 - dihydro - 3 - ethoxymethyl-4-methoxy-4-phenyl-2(1H)-quinazolinone.

13. A compound as defined in claim 11 of the formula 6-chloro - 3,4 - dihydro - 4 - ethoxy-3-ethoxymethyl-4-phenyl-2(1H)-quinazolinone.

14. A compound of the formula

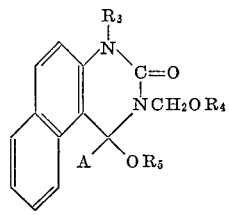

wherein A is selected from the group consisting of pyridyl and

$R_3$ is selected from the group consisting of hydrogen and lower alkyl, $R_4$ is selected from the group consisting of lower alkyl and hydroxy lower alkyl; $R_5$ is selected from the group consisting of hydrogen and lower alkyl and $R_6$ and $R_7$ are each selected from the group consisting of hydrogen and lower alkyl.

15. A compound as in claim 14 of the formula 1,2-dihydro-1-hydroxy - 2 - methoxymethyl - 1 - phenylbenzo[f]quinazolin-3(4H)-one.

References Cited
UNITED STATES PATENTS
2,176,413  10/1939  Baumann et al. _____ 260—251

ALEX MAZEL, Primary Examiner

R. V. RUSH, Assistant Examiner

U.S. Cl. X.R.

260—239.3, 256.4, 256.5; 424—251